(12) United States Patent
Song et al.

(10) Patent No.: US 10,111,210 B2
(45) Date of Patent: Oct. 23, 2018

(54) METHOD FOR IMPLEMENTING RADIO RESOURCE CONTROL PROTOCOL FUNCTION, MACRO BASE STATION, AND MICRO CELL NODE

(71) Applicant: Huawei Technologies Co., Ltd., Shenzhen (CN)

(72) Inventors: Weiwei Song, Shenzhen (CN); Bo Lin, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/854,414

(22) Filed: Dec. 26, 2017

(65) Prior Publication Data

US 2018/0124768 A1    May 3, 2018

Related U.S. Application Data

(63) Continuation of application No. 14/812,985, filed on Jul. 29, 2015, now Pat. No. 9,877,307, which is a continuation of application No. PCT/CN2013/071125, filed on Jan. 30, 2013.

(51) Int. Cl.
| | |
|---|---|
| *H04W 72/00* | (2009.01) |
| *H04W 4/00* | (2018.01) |
| *H04W 72/04* | (2009.01) |
| *H04W 68/00* | (2009.01) |
| *H04W 48/12* | (2009.01) |
| *H04W 36/04* | (2009.01) |
| *H04W 84/04* | (2009.01) |

(52) U.S. Cl.
CPC ....... *H04W 72/0406* (2013.01); *H04W 48/12* (2013.01); *H04W 68/005* (2013.01); *H04W 36/04* (2013.01); *H04W 84/045* (2013.01)

(58) Field of Classification Search
CPC ............. H04W 72/0406; H04W 48/12; H04W 68/005; H04W 36/04; H04W 84/045
USPC ........................................................ 455/450
See application file for complete search history.

(56) References Cited

U.S. PATENT DOCUMENTS

| | | | |
|---|---|---|---|
| 5,748,621 A | 5/1998 | Masuda et al. | |
| 7,853,259 B2 | 12/2010 | Xu et al. | |
| 2004/0002337 A1 | 1/2004 | Wheeler et al. | |
| 2004/0203623 A1 | 10/2004 | Wu | |

(Continued)

FOREIGN PATENT DOCUMENTS

| | | |
|---|---|---|
| CN | 101527941 A | 9/2009 |
| CN | 102208938 A | 10/2011 |

(Continued)

*Primary Examiner* — Rafael Pérez-Gutiérrez
*Assistant Examiner* — Mark G. Pannell
(74) *Attorney, Agent, or Firm* — Slater Matsil, LLP

(57) ABSTRACT

Embodiments of the present invention disclose a method for implementing a radio resource control protocol function, a macro base station, and a micro cell node. In the method, a macro base station configures control information and sends the control information to a micro cell node, so that the micro cell node forwards the control information to a user equipment. Therefore, the macro base station assists a micro cell node having no RRC function in completing generation and parsing of dedicated control information of the UE and cell common control information, so that a the user equipment can camp on or be handed over to the micro cell node.

20 Claims, 8 Drawing Sheets

(56) References Cited

U.S. PATENT DOCUMENTS

| | | | |
|---|---|---|---|
| 2007/0165595 A1 | 7/2007 | Xu et al. | |
| 2009/0197630 A1 | 8/2009 | Ahn et al. | |
| 2011/0044282 A1* | 2/2011 | Seo | H04L 1/0072 370/329 |
| 2011/0319066 A1* | 12/2011 | Chou | H04W 36/0077 455/422.1 |
| 2013/0003673 A1 | 1/2013 | Dinan | |
| 2013/0070692 A1 | 3/2013 | Miki et al. | |
| 2013/0157669 A1 | 6/2013 | Turtinen et al. | |
| 2013/0229931 A1* | 9/2013 | Kim | H04W 24/10 370/252 |
| 2013/0343270 A1 | 12/2013 | Abe et al. | |
| 2014/0004863 A1 | 1/2014 | Zhang et al. | |
| 2014/0056243 A1* | 2/2014 | Pelletier | H04W 74/04 370/329 |
| 2014/0079031 A1 | 3/2014 | Parkvall et al. | |
| 2014/0128092 A1 | 5/2014 | Xiong et al. | |
| 2014/0171091 A1* | 6/2014 | Cai | H04W 48/20 455/450 |
| 2014/0198655 A1 | 7/2014 | Ishii et al. | |

FOREIGN PATENT DOCUMENTS

| | | | |
|---|---|---|---|
| CN | 102469557 A | 5/2012 | |
| CN | 102883440 A | 1/2013 | |
| EP | 2525615 A1 | 11/2012 | |
| WO | 0030394 A1 | 5/2000 | |
| WO | 1535038 A | 10/2004 | |
| WO | 2011083650 A1 | 7/2011 | |
| WO | 2012063792 A1 | 5/2012 | |
| WO | WO 2012/063792 A1 * | 5/2012 | H04W 36/0005 |

* cited by examiner

METHOD FOR IMPLEMENTING RADIO RESOURCE CONTROL PROTOCOL FUNCTION, MACRO BASE STATION, AND MICRO CELL NODE

CROSS-REFERENCE TO RELATED APPLICATIONS

This application is a continuation of U.S. patent application Ser. No. 14/812,985, filed on Jul. 29, 2015, which is a continuation of International Application No. PCT/CN2013/071125, filed on Jan. 30, 2013. All of the afore-mentioned patent applications are hereby incorporated by reference in their entireties.

TECHNICAL FIELD

The present disclosure pertains to the communications field, and in particular, relates to a method for implementing a radio resource control protocol function, a macro base station, and a micro cell node.

BACKGROUND

With development of mobile communications technologies and massive deployment of a 3rd generation mobile communications technology (3G) network, a high-rate and high-bandwidth communications service greatly improves user experience. However, more challenges are brought to the operation of communications services, although massive popularization of a smartphone injects new vitality into the communications services. Because a limited throughput of a 3G network cannot meet such heavy traffic, a current network of an operator has been faced with great pressure, and even massive deployment of a Long Term Evolution (LTE) system in future can meet only some of the demand. Due to its flexible deployment, low cost, and broadband transmission provided for a user, a micro cell has become a key direction in which an LTE network is evolving. A micro cell node of the micro cell may be a micro cell node of a small cell, an indoor base station (e.g., a Femto base station), a local wireless access point (AP), or a low power node (LPN).

In consideration of reducing costs of an access point, and simplifying a function of the micro cell node, the micro cell node may have no radio resource control (RRC) protocol function layer, or may have only a simple RRC function layer. That is, the micro cell node may not generate or parse a dedicated RRC message of a user equipment (UE), may have no radio resource management function, or may not generate all cell common control information. However, the function of the micro cell node is that the micro cell node independently allows access of a backward compatible UE, thereby implementing a necessary function for UE mobility. If the micro cell node does not have the function, access of the backward compatible UE is unavailable and a service cannot be provided for the backward compatible UE. The backward compatible UE refers to a UE in an earlier version. To access a cell, the backward compatible UE may have the following requirements for a base station: needing system information, needing to receive a paging message, and needing to establish a relationship with the base station by using an RRC message.

SUMMARY

An objective of embodiments of the present invention is to provide a method for implementing a radio resource control protocol (RRC) function, so as to resolve a problem of how to use a macro base station to assist a micro cell node in implementing the RRC function.

According to a first aspect, a method for implementing a radio resource control protocol function is provided. The method includes: configuring, by a macro base station, control information. The method also includes sending the control information to a micro cell node, so that the micro cell node combines the control information and control information that is preset by the micro cell node and then forwards combined control information to a user, or directly forwards the control information to a user, so as to implement all radio resource control protocol (RRC) functions of the micro cell node.

With reference to the first aspect, in a first possible implementation manner of the first aspect, the control information includes cell common control information and dedicated control information of a user equipment UE, where the cell common control information includes system information and paging information.

With reference to the first aspect or the first possible implementation manner of the first aspect, in a second possible implementation manner of the first aspect, before the configuring, by a macro base station, control information, the method further includes: performing negotiation between the macro base station and the micro cell node to determine the control information configured by the macro base station, where if the micro cell node has a part of simplified RRC functions and the micro cell node presets a part of control information, the control information configured by the macro base station includes only the dedicated control information of the user equipment (UE), or if the micro cell node has no RRC function and/or the micro cell node does not preset control information, the control information configured by the macro base station includes all control information.

With reference to the first aspect, the first possible implementation manner of the first aspect, or the second possible implementation manner of the first aspect, in a third possible implementation manner of the first aspect, the configuring, by a macro base station, control information includes: configuring, by the macro base station, a system information transmission configuration parameter for the micro cell node, where the system information transmission configuration parameter is information block content and transmission control information, the information block content includes all or a part of system information block content, and the transmission control information includes transmission control information of all or the part of the system information block content.

With reference to the third possible implementation manner of the first aspect, in a fourth possible implementation manner of the first aspect, the method further includes: if a transmission control manner of all or the part of the system information block content is fixed, configuring, by the macro base station for the micro cell node, the system information transmission configuration parameter that does not include information block content of a preset transmission control manner; or if the information block content is transmitted in a non-periodic manner, configuring transmission control information that is corresponding to the information block content and includes scheduling information of the system information block content, where the scheduling information includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle, and if scheduling information of the multiple pieces of information block content is the same and the scheduling information includes an information block content group, the scheduling information includes an arrangement sequence of the information block content in the information block content group.

With reference to the fourth possible implementation manner of the first aspect, in a fifth possible implementation manner of the first aspect, the method further includes: configuring, by the macro base station, a modification cycle of the system information of the micro cell node, where the modification cycle includes a cycle length and a start moment.

With reference to the fifth possible implementation manner of the first aspect, in a sixth possible implementation manner of the first aspect, the method further includes: re-configuring, by the macro base station, a system information transmission configuration parameter for the micro cell node; and if content of the system information is updated, specifying, by the macro base station, a start moment at which the system information is updated. The start moment is a specific moment or is indicated or preset on the micro cell node by the macro base station, and the specific moment is represented by a system frame number and a radio frame number. The start moment being indicated or preset on the micro cell node by the macro base station includes the micro cell node starting to transmit updated content at a start moment of a next or an $N^{th}$ modification cycle.

With reference to the first aspect, the first possible implementation manner of the first aspect, or the second possible implementation manner of the first aspect, in a seventh possible implementation manner of the first aspect, the configuring, by a macro base station, control information includes: configuring, by the macro base station, a paging information transmission configuration parameter for the micro cell node. The paging information transmission configuration parameter includes paging information content and paging transmission control information, and the paging transmission control information includes a Radio Link Control (RLC) transmission configuration parameter, a Media Access Control (MAC) layer transmission configuration parameter, and physical-layer transmission configuration information. The paging transmission control information includes a transmission moment corresponding to paging content, where the transmission moment is a moment of one time of transmission or moments of multiple times of transmission.

With reference to the seventh possible implementation manner of the first aspect, in an eighth possible implementation manner of the first aspect, the method further includes: when the transmission moment corresponding to the paging content is moments of multiple times of transmission, configuring, by the macro base station when configuring the paging transmission control information, the transmission moments by using a transmission moment list or by using a start moment and a transmission cycle.

According to a second aspect, a method for implementing a radio resource control protocol (RRC) function is provided. The method includes: receiving, by a micro cell node, control information sent by a macro base station. The method also includes forwarding the control information to a user, so that the micro cell node implements the RRC function.

With reference to the second aspect, in a first possible implementation manner of the second aspect, if the micro cell node has a part of simplified RRC functions and the micro cell node presets a part of control information, the control information configured by the macro base station includes only dedicated control information of a user equipment UE. If the micro cell node has no RRC function and/or the micro cell node does not preset control information, the control information configured by the macro base station includes all control information, including cell common control information and the dedicated control information of the user equipment UE, where the cell common control information includes system information and paging information.

With reference to the second aspect or the first possible implementation manner of the second aspect, in a second possible implementation manner of the second aspect, the forwarding, by the micro cell node, the control information to a user includes: carrying the forwarded control information by using a signaling radio bearer (SRB) or a data radio bearer (DRB), where a control message transmitted by the SRB includes an RRC message transmitted through a common control channel (CCCH) or a dedicated control channel (DCCH), and the RRC message transmitted through the DCCH is an RRC message including a non-access stratum (NAS) message and/or measurement information.

With reference to the second possible implementation manner of the second aspect, in a third possible implementation manner of the second aspect, before a step of receiving the dedicated control information that is of the UE and sent by the macro base station, the method further includes: receiving an RRC message that is transmitted by the user through a random access channel (RACH); forwarding the RRC message and a user identifier to the macro base station; and receiving a bearer establishment request that is between the micro cell node and the macro base station and sent by the macro base station. The bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user.

According to a third aspect, a macro base station is provided. The macro base station includes: a configuring unit, configured to configure, by the macro base station, control information. The macro base station further includes a first sending unit, configured to send the control information to a micro cell node, so that the micro cell node combines the control information and control information that is preset by the micro cell node and then forwards combined control information to a user, or directly forwards the control information to a user, so as to implement all radio resource control protocol (RRC) functions of the micro cell node.

With reference to the third aspect, in a first possible implementation manner of the third aspect, the control information includes cell common control information and dedicated control information of a user equipment (UE), where the cell common control information includes system information and paging information.

With reference to the third aspect or the first possible implementation manner of the third aspect, in a second possible implementation manner of the third aspect, the macro base station further includes a negotiating unit, configured to perform negotiation between the macro base station and the micro cell node to determine the control information configured by the macro base station, where if the micro cell node has a part of simplified RRC functions and the micro cell node presets a part of control information, the control information configured by the macro base station includes only the dedicated control information of the UE; or if the micro cell node has no RRC function and/or the micro cell node does not preset control information, the control information configured by the macro base station includes all control information.

With reference to the third aspect, the first possible implementation manner of the third aspect, or the second possible implementation manner of the third aspect, in a third possible implementation manner of the third aspect, the configuring unit is specifically configured to configure, by the macro base station, a system information transmission configuration parameter for the micro cell node, where the system information transmission configuration parameter is information block content and transmission control information, the information block content includes all or a part of system information block content, and the transmission control information includes transmission control information of all or the part of the system information block content.

With reference to the third possible implementation manner of the third aspect, in a fourth possible implementation manner of the third aspect, the macro base station further includes: a first configuring subunit, configured to configure, by the macro base station for the micro cell node, if a transmission control manner of all or the part of the system information block content is fixed, the system information transmission configuration parameter that does not include information block content of a preset transmission control manner; or if the information block content is transmitted in a non-periodic manner, configure transmission control information that is corresponding to the information block content and includes scheduling information of the system information block content, where the scheduling information includes a scheduling cycle in which the information block content is transmitted, and the scheduling cycle is used to indicate a transmission cycle and a transmission window length of the information block content and is used to indicate a moment or a range of a transmission moment at which the information block content is transmitted in each scheduling cycle, and if scheduling information of the multiple pieces of information block content is the same and the scheduling information includes an information block content group, the scheduling information includes an arrangement sequence of the information block content in the information block content group.

With reference to the fourth possible implementation manner of the third aspect, in a fifth possible implementation manner of the third aspect, the macro base station further includes a second configuring subunit, configured to configure, by the macro base station, a modification cycle of the system information of the micro cell node, where the modification cycle includes a cycle length and a start moment.

With reference to the fifth possible implementation manner of the third aspect, in a sixth possible implementation manner of the third aspect, the macro base station further includes: a third configuring subunit, configured to re-configure, by the macro base station, a system information transmission configuration parameter for the micro cell node; and if content of the system information is updated, specify, by the macro base station, a start moment at which the system information is updated. The start moment is a specific moment or is indicated or preset on the micro cell node by the macro base station, and the specific moment is represented by a system frame number and a radio frame number. The start moment being indicated or preset on the micro cell node by the macro base station includes the micro cell node starting to transmit updated content at a start moment of a next or an $N^{th}$ modification cycle.

With reference to the third aspect, the first possible implementation manner of the third aspect, or the second possible implementation manner of the third aspect, in a seventh possible implementation manner of the third aspect, the configuring unit is specifically configured to: configure, by the macro base station, a paging information transmission configuration parameter for the micro cell node, where the paging information transmission configuration parameter includes paging information content and paging transmission control information, and the paging transmission control information includes a radio link control (RLC) transmission configuration parameter, a media access control (MAC) layer transmission configuration parameter, and physical-layer transmission configuration information, where the paging transmission control information includes a transmission moment corresponding to paging content, where the transmission moment is a moment of one time of transmission or moments of multiple times of transmission.

With reference to the seventh possible implementation manner of the third aspect, in an eighth possible implementation manner of the third aspect, the macro base station further includes a fourth configuring subunit, configured to: when the transmission moment corresponding to the paging content is the moments of multiple times of transmission, configure, by the macro base station when configuring the paging transmission control information, the transmission moments by using a transmission moment list or by using a start moment and a transmission cycle.

According to a fourth aspect, a micro cell node is provided. The micro cell node includes a first receiving unit, configured to receive, by the micro cell node, control information sent by a macro base station. The micro cell node also includes a first forwarding unit, configured to forward the control information to a user, so that the micro cell node implements a method of an RRC function.

With reference to the fourth aspect, in a first possible implementation manner of the fourth aspect, the control information includes: if the micro cell node has a part of simplified RRC functions and the micro cell node presets a part of control information, the control information configured by the macro base station includes only dedicated control information of a user equipment UE; and if the micro cell node has no RRC function and/or the micro cell node does not preset control information, the control information configured by the macro base station includes all control information, including cell common control information and the dedicated control information of the user equipment UE, where the cell common control information includes system information and paging information.

With reference to the fourth aspect or the first possible implementation manner of the fourth aspect, in a second possible implementation manner of the fourth aspect, the first forwarding unit is specifically configured to carry the forwarded control information by using a signaling radio bearer (SRB) or a data radio bearer (DRB), where a control message transmitted by the SRB includes an RRC message transmitted through a common control channel (CCCH) or a dedicated control channel (DCCH), and the RRC message transmitted through the DCCH is an RRC message including a non-access stratum (NAS) message and/or measurement information.

With reference to the second possible implementation manner of the fourth aspect, in a third possible implementation manner of the fourth aspect, the micro cell node further includes: a second receiving unit, configured to receive an RRC message transmitted by a user; a second forwarding unit, configured to forward the RRC message and a user identifier to the macro base station; and a third receiving unit, configured to receive a bearer establishment request that is between the micro cell node and the macro base station and sent by the macro base station. The bearer establishment request includes a configuration parameter for establishing a control signaling transmission bearer that is between the macro base station and the micro cell node and corresponding to the signaling radio bearer and a configuration parameter for establishing a signaling radio bearer between the micro cell node and the user.

Compared with the prior art, the embodiments of the present invention provide a method for implementing a radio resource control protocol function. In the method, a macro base station configures control information and sends the control information to a micro cell node, so that the micro cell node forwards the control information to a UE. Therefore, the macro base station assists a micro cell node having no RRC function in completing generation and parsing of dedicated control information of the UE and cell common information, so that a user can camp on or be handed over to the micro cell node.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

Figure 1:
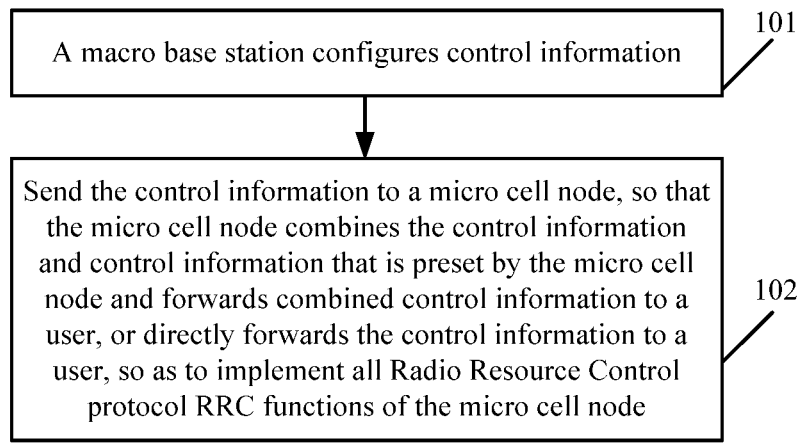
FIG. 1 is a flowchart of a method for implementing a radio resource control protocol function according to an embodiment of the present invention.

Referring to FIG. 1, FIG. 1 is a flowchart of a method for implementing a radio resource control protocol function according to an embodiment of the present invention. As shown in FIG. 1, the method may include the following steps.

Step 101: A macro base station configures control information. The control information may include cell common control information and dedicated control information of a user equipment (UE). The cell common control information may include system information and paging information.

Optionally, before configuring, by a macro base station, control information required by a UE for accessing a micro cell node of a micro cell, the method may further include performing negotiation between the macro base station and the micro cell node to determine the control information configured by the macro base station. When the micro cell node has a part of simplified RRC functions and the micro cell node presets a part of control information, the control information configured by the macro base station may include only the dedicated control information of the user equipment. When the micro cell node has no RRC function and/or the micro cell node does not preset control information, the control information configured by the macro base station may include all control information.

Step 102: The macro base station sends the control information to a micro cell node, so that the micro cell node combines the control information and control information that is preset by the micro cell node, and then forwards combined control information to a user, or directly forwards the control information to a user equipment, so as to implement all radio resource control protocol (RRC) functions of the micro cell node.

Optionally the control information that is configured by the macro base station may include a system information transmission configuration parameter for the micro cell node. The system information transmission configuration parameter may include information block content and transmission control information. The information block content may include all or a part of system information block content. The transmission control information may include transmission control information of all or a part of the system information block content.

The system information transmission configuration parameter may include the information block content and the transmission control information of the system information. The information block content may include all or a part of the system information block content, for example, master information block (MIB) content, system information block (SIB) 1 content, SIB 2 content, and SIB 3 content. The transmission control information may include transmission control information of all or a part of the system information block content, for example, MIB transmission control information, SIB 1 transmission control information, SIB 2 transmission control information, and SIB 3 transmission control information.

Specifically, content included in different system information blocks may be different. For example, an MIB may include downlink bandwidth, PHICH configuration information, and a system frame number (SFN), while a SIB 1 may include a cell access parameter, a cell selection parameter, system information scheduling information, and the like. Content of transmission control information of different system information blocks is also different. Generally, transmission control information of each system information block may include an RLC transmission manner, a MAC transmission manner, and a physical-layer transmission manner. The RLC transmission manner is one of transparent mode (TM), unacknowledged mode (UM), and acknowledged mode (AM). The information about the MAC transmission manner may include whether segmentation is allowed, a mapped transmission channel, whether a HARQ mechanism is used, how to use a HARQ configuration parameter, and the like. The physical-layer transmission manner may include a physical transmission channel, a transmission time-frequency resource, and a modulation and coding scheme.

Optionally, the method may further include: when a transmission control manner of all or a part of the system information block content is fixed, configuring, by the macro base station for the micro cell node, the system information transmission configuration parameter that does not include information block content of a preset transmission control manner; or when the information block content is transmitted in a non-periodic manner, configuring, by the macro base station, transmission control information that is corresponding to the information block content and includes scheduling information of the system information block content. The scheduling information may include a scheduling cycle in which the information block content is transmitted, and the scheduling cycle may be used to indicate a transmission cycle and a transmission window length of the information block content. The scheduling cycle may also be used to indicate a moment or a range of a transmission moment at which the information block content is transmitted in each scheduling cycle. When scheduling information of the multiple pieces of information block content is the same and the scheduling information includes an information block content group, the scheduling information may include an arrangement sequence of the information block content in the information block content group.

Optionally, the method may further include configuring, by the macro base station, a modification cycle of the system information of the micro cell node, where the modification cycle includes a cycle length and a start moment.

Optionally, the method may further include re-configuring, by the macro base station, a system information transmission configuration parameter for the micro cell node; and if content of the system information is updated, and specifying, by the macro base station, a start moment at which the system information is updated. The start moment may be a specific moment, or may be indicated or preset on the micro cell node by the macro base station, and the specific moment may be represented by a system frame number and a radio frame number. The start moment may be indicated or preset on the micro cell node by the macro base station such that the micro cell node starts to transmit updated content at a start moment of a next or an $N_{th}$ modification cycle.

Optionally, the configuring, by a macro base station, control information may include configuring, by the macro base station, a paging information transmission configuration parameter for the micro cell node. The paging information transmission configuration parameter may include paging information content and paging transmission control information, and the paging transmission control information may include an RLC transmission configuration parameter, a MAC layer transmission configuration parameter, and physical-layer transmission configuration information. The paging transmission control information may include a transmission moment corresponding to paging content, and the transmission moment may be a moment of one time of transmission or moments of multiple times of transmission.

Specifically, the macro base station may configure the system paging information transmission configuration parameter for the micro cell node. The system paging information transmission configuration parameter may include the paging information content and the paging transmission control information. The macro base station may configure, at a time, one or more pieces of paging information content and one or more pieces of transmission control information corresponding to the one or more pieces of paging information content. For example, a paging configuration may include two pieces of paging content and two pieces of transmission control information, that is, paging information content 1 and transmission control information 1, and paging information content 2 and transmission control information 2. The paging transmission control information may include the RLC transmission configuration parameter, for example, a transparent transmission mode. The paging transmission control information may further include the MAC layer transmission configuration parameter, including transmission channel mapping, whether a hybrid automatic repeat request (HARQ) mechanism is used, and the like. For example, a transparent transmission manner may be used on a MAC layer for transmission through a broadcast channel (BCH) to a physical entity and the HARQ mechanism is not used. The paging transmission control information may include the physical-layer transmission configuration information. For example, a moment may be transmitted on a physical layer through a physical downlink control channel (PDCCH) or physical downlink shared channel (PDSCH). A transmission moment that is corresponding to paging content and included in the paging transmission control information may be a moment (an SFN and a subframe number) of one time of transmission or moments of multiple times of transmission. If the transmission moment corresponding to the paging content is the moments of multiple times of transmission, the information may be used to configure the transmission moment using a transmission moment list or using a start moment and a transmission cycle.

Optionally, the method may further include, when the transmission moment corresponding to the paging content is the moments of multiple times of transmission, configuring, by the macro base station when configuring the paging transmission control information, the transmission moment by using a transmission moment list or by using a start moment and a transmission cycle.

Optionally, configuring, by a macro base station, control information may include configuring, by the macro base station, dedicated control information of a user equipment. The dedicated control information of the user equipment may include a control message transmitted by using a signaling radio bearer (SRB). The control message transmitted by the SRB may include an RRC message transmitted through a common control channel (CCCH) or an RRC message transmitted through a dedicated control channel (DCCH), and the RRC message transmitted through the DCCH may be an RRC message including a non-access stratum (NAS) message and/or measurement information.

Optionally, before a step of receiving the dedicated control information sent by the macro base station, the method may further include: receiving a request message of the micro cell node, where the request message carries an RRC message of the UE; determining, by the macro base station, whether the user equipment is allowed to access the micro cell node; and when the macro base station determines that the user equipment is allowed to access the micro cell node, sending, by the macro base station, a bearer establishment request to the micro cell node, so that the micro cell node establishes a control information bearer between the micro cell node and the macro base station.

This embodiment of the present invention provides a method for implementing a radio resource control protocol function. In the method, a macro base station may configure control information and send the control information to a micro cell node, so that the micro cell node forwards the control information to a user equipment. Therefore, the macro base station assists the micro cell node having no RRC function in completing generation and parsing of dedicated control information of the user equipment and cell common information, so that a user equipment can camp on or be handed over to the micro cell node.

Figure 2:
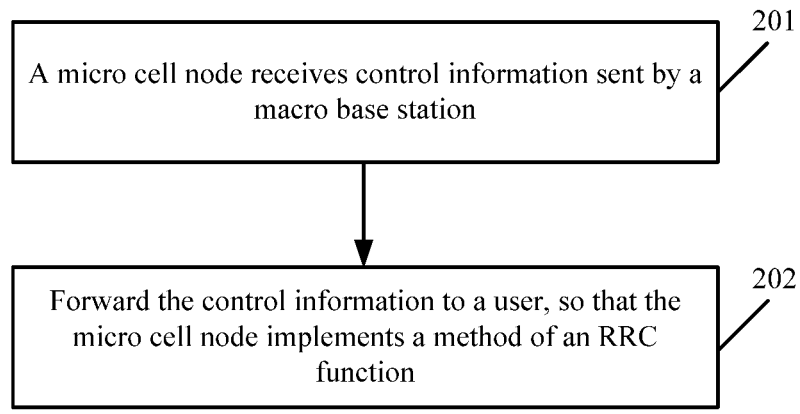
FIG. 2 is a flowchart of another method for implementing a radio resource control protocol function according to an embodiment of the present invention.

Referring to FIG. 2, FIG. 2 is a flowchart of another method for implementing a radio resource control protocol function according to an embodiment of the present invention. As shown in FIG. 2, the method includes the following steps.

Step 201: A micro cell node receives control information sent by a macro base station. If the micro cell node has a part of simplified RRC functions and the micro cell node presets a part of control information, the control information configured by the macro base station may include only dedicated control information of a user equipment. If the micro cell node has no RRC function and/or the micro cell node does not preset control information, the control information configured by the macro base station may include all control information, including cell common control information and the dedicated control information of the user equipment. The cell common control information may include system information and paging information.

Step 202: Forward the control information to a user equipment, so that the micro cell node implements the RRC function.

Optionally, forwarding, by the micro cell node, the control information to a user equipment may include: carrying the forwarded control information by using a signaling radio bearer (SRB) or a data radio bearer (DRB). A control message transmitted by the SRB may include an RRC message transmitted through a common control channel (CCCH) or a dedicated control channel (DCCH), and the RRC message transmitted through the DCCH may be an RRC message including a non-access stratum (NAS) message and/or measurement information.

Optionally, before receiving the dedicated control information that is of the user equipment and sent by the macro base station, the method may further includes receiving an RRC message that is transmitted by the user equipment through a random access channel (RACH); forwarding the RRC message and a user equipment identifier to the macro base station; and receiving a bearer establishment request that is between the micro cell node and the macro base station and sent by the macro base station. The bearer establishment request may include a configuration parameter for establishing a control signaling transmission bearer that is between the macro base station and the micro cell node and corresponding to the signaling radio bearer. The bearer establishment request may also include a configuration parameter for establishing a signaling radio bearer between the micro cell node and the user equipment.

This embodiment of the present invention provides a method for implementing a radio resource control protocol function. In the method, a macro base station configures control information and sends the control information to a micro cell node, so that the micro cell node forwards the control information to a user equipment. Therefore, the macro base station assists the micro cell node having no RRC function in completing generation and parsing of dedicated control information of the user equipment and cell common information, so that the user equipment can camp on or be handed over to the micro cell node.

Figure 3:
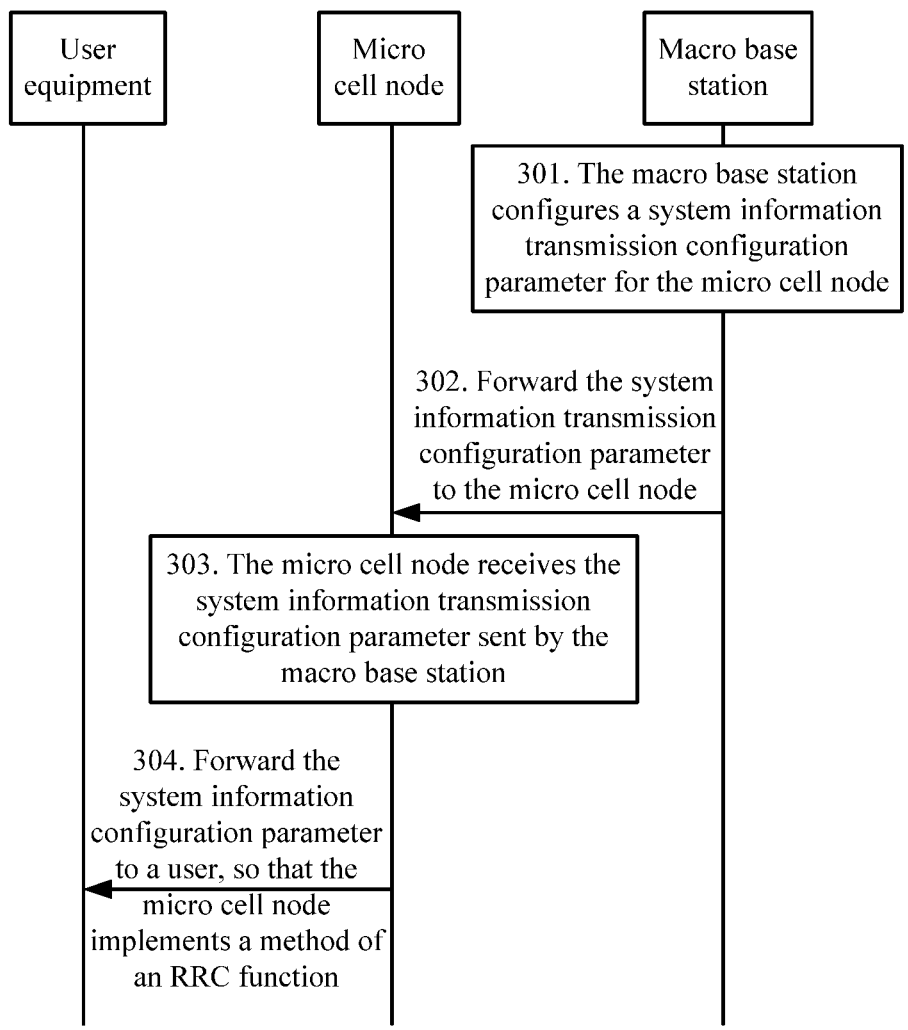
FIG. 3 is a flowchart of another method for implementing a radio resource control protocol function according to an embodiment of the present invention.

Referring to FIG. 3, FIG. 3 is a flowchart of another method for implementing a radio resource control protocol function according to an embodiment of the present invention. As shown in FIG. 3, the method may include the following steps.

Step 301: A macro base station configures a system information transmission configuration parameter for a micro cell node.

The system information transmission configuration parameter may include information block content and transmission control information of system information. The information block content may include all or a part of system information block content, for example, master information block content, system information block 1 content, SIB 2 content, and SIB 3 content. The transmission control information may include transmission control information of all or a part of the system information block content, for example, MIB transmission control information, SIB 1 transmission control information, SIB 2 transmission control information, and SIB 3 transmission control information.

Specifically, transmission control information of the master information block content may include an RLC transmission configuration parameter, for example, a transparent transmission mode. The transmission control information of the master information block content may include a MAC layer transmission configuration parameter, including transmission channel mapping, whether a HARQ mechanism is used, and the like. For example, a transparent transmission manner is used on a MAC layer for transmission through a BCH channel to a physical entity and the HARQ mechanism is not used. The transmission control information of the master information block content may include and physical-layer transmission configuration information. For example, a time-frequency resource is transmitted through a PBCH, for example, the time-frequency resource is an SFN and a subframe number and a frequency domain is an RB number, a modulation and coding scheme, and a transmission cycle. Transmission control information of the system information block content may include an RLC transmission mode, for example, a transparent transmission mode. The transmission control information of the system information block content may include a MAC layer transmission mode, including transmission channel mapping, whether a HARQ mechanism is used, and the like. For example, a transparent transmission manner is used on a MAC layer for transmission through a BCH channel to a physical entity and the HARQ mechanism is not used. The transmission control information of the system information block content may include a physical transmission configuration, for example, a physical-layer transmission channel and a dedicated temporary identifier. System information block content that is transmitted periodically further may include a transmission cycle.

The method may further include, when a transmission control manner of all or a part of the system information block content is fixed, for example, the transmission control manner of the system information block content is fixed in the micro cell node, configuring, by the macro base station for the micro cell node, the system information transmission configuration parameter that may not include information block content of a preset transmission control manner. When the information block content is transmitted in a non-periodic manner, the method may include configuring transmission control information that is corresponding to the information block content and includes scheduling information of the system information block content. The scheduling information may be used to indicate a moment or a range of a transmission moment at which the micro cell node transmits the information block content. The scheduling information may specifically include a scheduling cycle in which the information block content is transmitted. The scheduling cycle may be used to indicate a transmission cycle and a transmission window length of the information block content, and to indicate a moment or a range of a transmission moment at which the information block content is transmitted in each scheduling cycle. Specifically, the information block content may start to be transmitted from a start moment of each scheduling cycle and within a range of the transmission window length. If scheduling information of multiple pieces of information block content is the same and the scheduling information includes an information block content group, the scheduling information may include an arrangement sequence of the information block content in the information block content group.

The method may further include configuring, by the macro base station, the transmission control information that may further include a modification cycle of the system information, where the modification cycle includes a cycle length and a start moment.

The method may further include receiving a system information transmission configuration parameter re-configured by the macro base station for the micro cell node; and if content of the system information is updated, specifying, by the macro base station, a start moment at which the system information is updated. The start moment may be a specific moment or may be indicated or preset on the micro cell node by the macro base station. The specific moment may be represented by a system frame number and a radio frame number. The start moment may be indicated or preset on the micro cell node by the macro base station such that the micro cell node starts to transmit updated content at a start moment of a next or an Nth modification cycle.

Step 302: Forward the system information transmission configuration parameter to the micro cell node.

Step 303: The micro cell node receives the system information transmission configuration parameter sent by the macro base station.

Step 304: Forward the system information transmission configuration parameter to a user equipment, so that the micro cell node implements the RRC function.

The micro cell node establishes a transmission radio bearer according to the received transmission configuration parameter, specifically including an RLC, MAC, or MAC physical layer configuration, so as to transmit system information. The micro cell node transmits the system information between user equipments according to the system information block content and the transmission control information.

This embodiment of the present invention provides a method for implementing a radio resource control protocol function. In the method, a macro base station configures control information and sends the control information to a micro cell node, so that the micro cell node forwards the control information to a user equipment. Therefore, the macro base station assists the micro cell node having no RRC function in completing generation and parsing of dedicated control information of the user equipment and cell common information, so that the user equipment can camp on or be handed over to the micro cell node.

Figure 4:
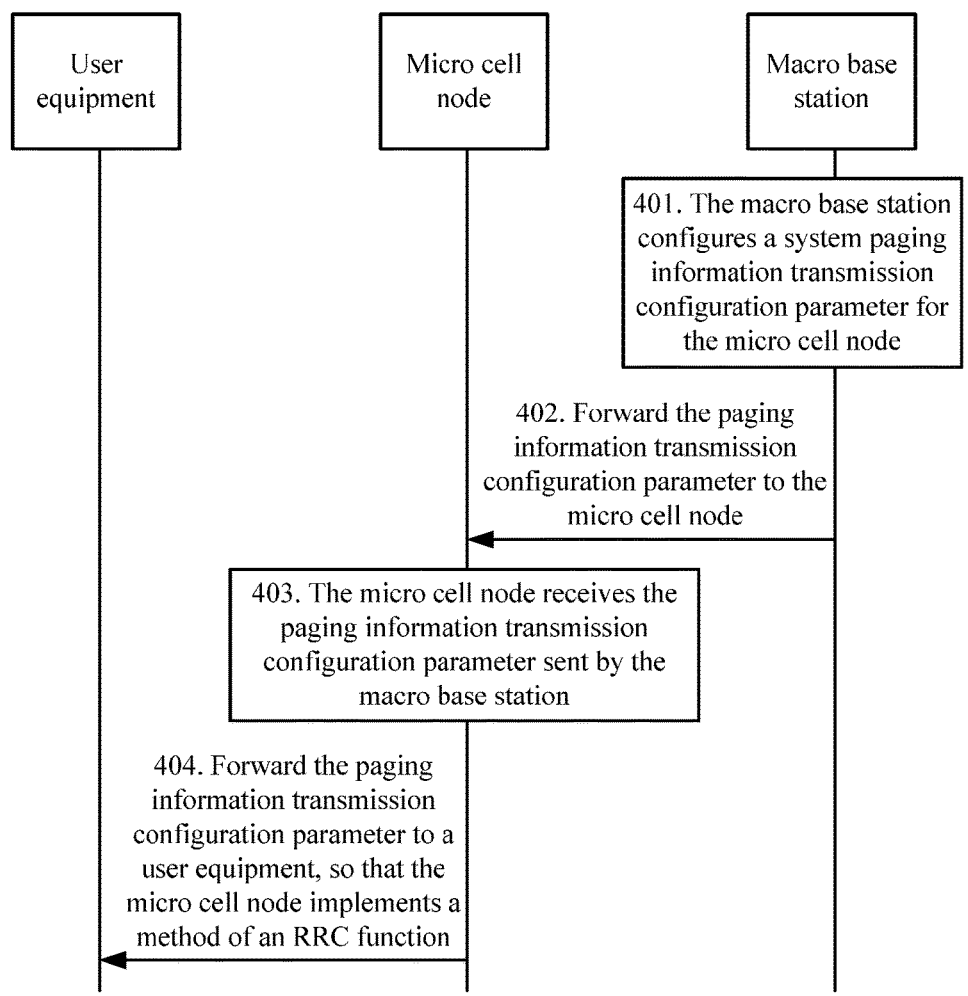
FIG. 4 is a flowchart of another method for implementing a radio resource control protocol function according to an embodiment of the present invention.

Referring to FIG. 4, FIG. 4 is a schematic diagram of another method for implementing a radio resource control protocol function according to an embodiment of the present invention. As shown in FIG. 4, the method includes the following steps:

Step 401: A macro base station configures a paging information transmission configuration parameter for a micro cell node.

Specifically, the macro base station may configure the paging information transmission configuration parameter for the micro cell node, where the paging information transmission configuration parameter includes paging information content and paging transmission control information. The macro base station may configure, at a time, one or more pieces of paging information content and one or more pieces of transmission control information corresponding to the one or more pieces of paging information content. For example, a paging configuration may include two pieces of paging content and two pieces of transmission control information, that is, paging information content 1 and transmission control information 1, and paging information content 2 and transmission control information 2. The paging transmission control information includes an RLC transmission configuration parameter, for example, a transparent transmission mode. The paging transmission control information may include a MAC layer transmission configuration parameter, including transmission channel mapping, whether a HARQ mechanism is used, and the like. For example, a transparent transmission manner may be used on a MAC layer for transmission through a BCH channel to a physical entity and the HARQ mechanism is not used. The paging transmission control information may further include physical-layer transmission configuration information. For example, a moment is transmitted on a physical layer through a PDCCH channel and a PDSCH channel. In one example, a transmission moment that is corresponding to paging content and included in the paging transmission control information may be a moment (an SFN and a subframe number) of one time of transmission or moments of multiple times of transmission. If the transmission moment corresponding to the paging content is the moments of multiple times of transmission, the information may be used to configure the transmission moment by using a transmission moment list or by using a start moment and a transmission cycle.

Step 402: Forward the paging information transmission configuration parameter to the micro cell node.

Step 403: The micro cell node receives the paging information transmission configuration parameter sent by the macro base station.

Step 404: Forward the paging information transmission configuration parameter to a user equipment, so that the micro cell node implements the RRC function.

Specifically, forwarding the paging information transmission configuration parameter to a user equipment may include transmitting the obtained paging information transmission configuration parameter through a PDCCH channel or a PDSCH channel to the user equipment.

The micro cell node establishes a transmission radio bearer according to the received paging transmission control information parameter, specifically including an RLC, MAC, or MAC physical layer configuration, so as to transmit system information. The micro cell node transmits the system information between user equipments according to the system information block content and the transmission control information.

This embodiment of the present invention provides a method for implementing a radio resource control protocol function. In the method, a macro base station configures control information and sends the control information to a micro cell node, so that the micro cell node forwards the control information to a user equipment. Therefore, the macro base station assists the micro cell node having no RRC function in completing generation and parsing of dedicated control information of the user equipment and cell common information, so that the user equipment can camp on or be handed over to the micro cell node.

Figure 5:
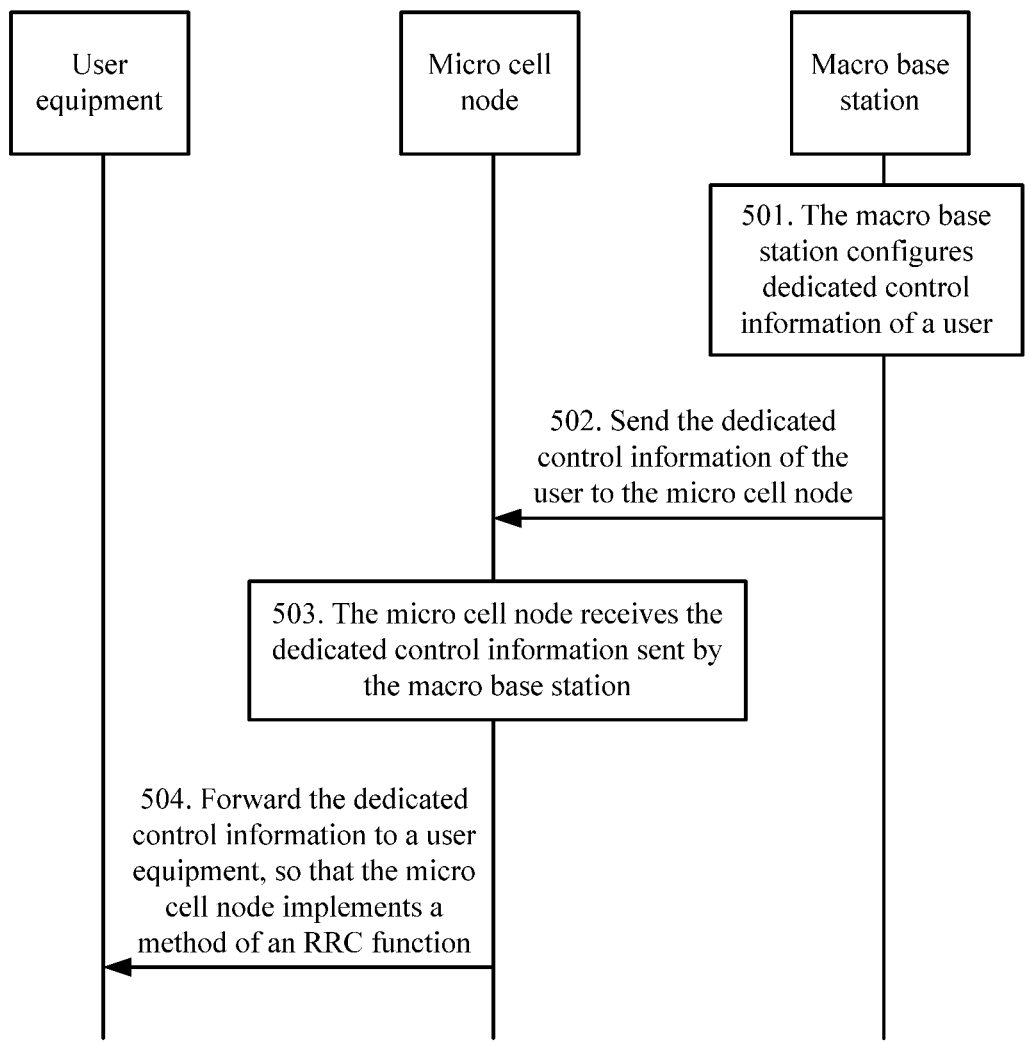
FIG. 5 is a flowchart of another method for implementing a radio resource control protocol function according to an embodiment of the present invention.

Referring to FIG. 5, FIG. 5 is a flowchart of another method for implementing a radio resource control protocol function according to an embodiment of the present invention. As shown in FIG. 5, the method includes the following steps.

Step 501: A macro base station configures dedicated control information of a user equipment.

Specifically, the dedicated control information of the user equipment may include a control message transmitted by an SRB. Specifically, the control message may include an RRC message transmitted through a CCCH or an RRC message transmitted through a DCCH, and the RRC message transmitted through the DCCH may be an RRC message including a NAS message and/or measurement information.

Step 502: Send the dedicated control information of the user equipment to a micro cell node.

Optionally, before sending the dedicated control information of the user equipment to a micro cell node, the method may further include: receiving a request message of the micro cell node, where the request message carries an RRC message of a UE; determining, by the macro base station, whether the user equipment is allowed to access the micro cell node; and if the macro base station determines that the user equipment is allowed to access the micro cell node, sending, by the macro base station, a bearer establishment request to the micro cell node, so that the micro cell node establishes a control information bearer between the micro cell node and the macro base station.

Specifically, the user equipment may identify, according to information that is about a UE identifier and included in uplink transmission scheduled for the first time in a random access process, that the information is control information transmitted by the user equipment. The UE identifier may be a NAS-layer UE identifier or an AS-layer UE identifier. The message may be a request message for initial access or RRC connection re-establishment of the user equipment. For example, when the uplink transmission scheduled by the user equipment for the first time includes the NAS-layer UE identifier, the micro cell node may identify that a message carried in the transmission is an RRC connection establishment request message of the user equipment. The micro cell node forwards the RRC message and the UE identifier to the macro base station through an interface between the micro cell node and the macro base station.

Step 503: The micro cell node receives the dedicated control information sent by the macro base station.

Optionally, before receiving the dedicated control information that is of the user equipment and sent by the macro base station, the method may further include: receiving an RRC message that is transmitted by the user equipment through a random access channel (RACH); forwarding the RRC message and a user identifier to the macro base station; and receiving a bearer establishment request that is between the micro cell node and the macro base station and sent by the macro base station. The bearer establishment request includes a configuration parameter for establishing a control signaling transmission bearer that is between the macro base station and the micro cell node and corresponding to the signaling radio bearer, and a configuration parameter for establishing a signaling radio bearer between the micro cell node and the user equipment.

Step 504: Forward the dedicated control information to a user equipment, so that the micro cell node implements the RRC function.

This embodiment of the present invention provides a method for implementing a radio resource control protocol function. In the method, a macro base station configures control information and sends the control information to a micro cell node, so that the micro cell node forwards the control information to a user equipment. Therefore, the macro base station assists the micro cell node having no RRC function in completing generation and parsing of dedicated control information of the UE and cell common information, so that the user equipment can camp on or be handed over to the micro cell node.

Figure 6:
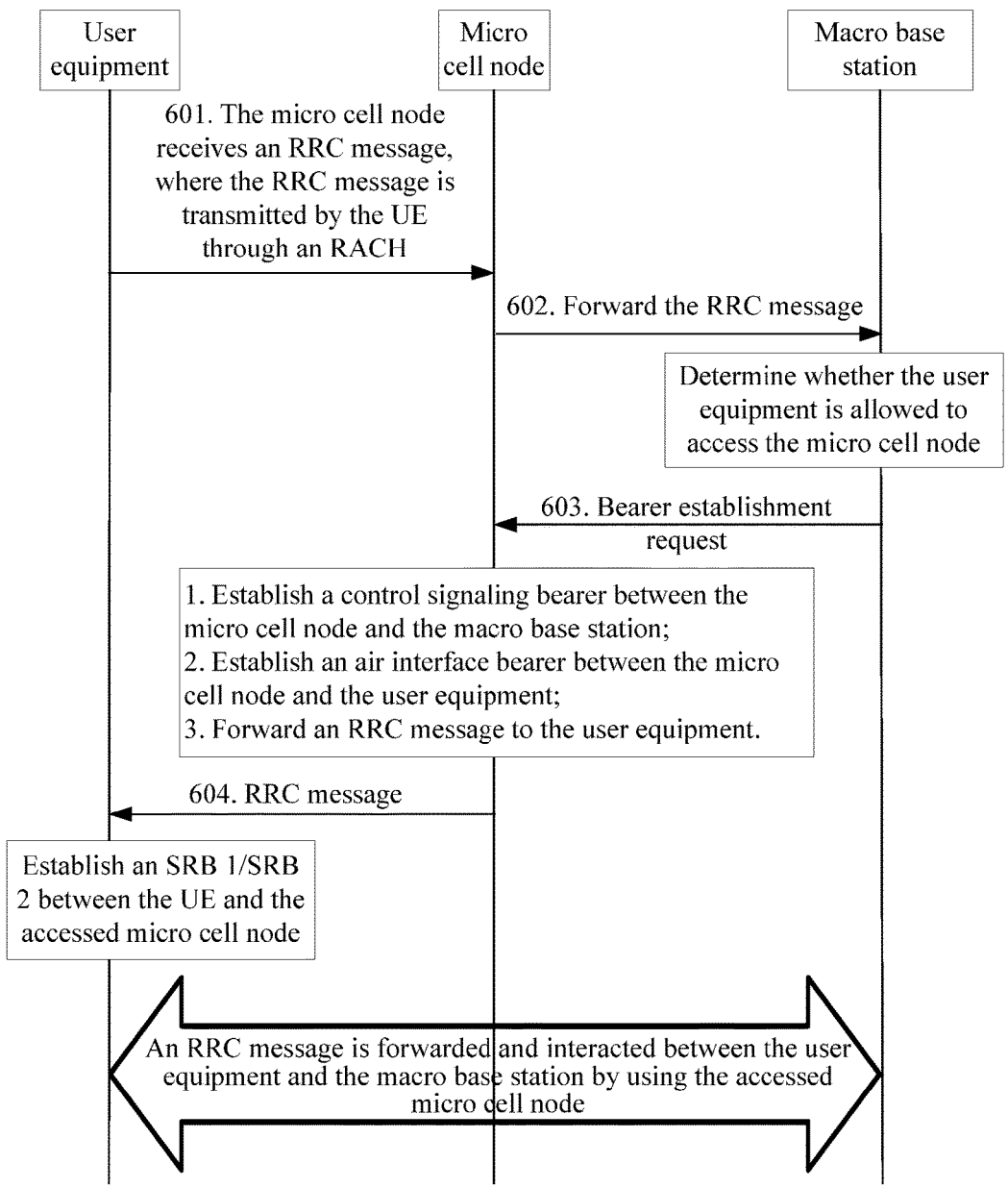
FIG. 6 is a flowchart of another method for implementing a radio resource control protocol function according to an embodiment of the present invention.

Referring to FIG. 6, FIG. 6 is a flowchart of another method for implementing a radio resource control protocol function according to an embodiment of the present invention.

Dedicated control signaling of a UE may include an RRC message transmitted by an SRB 0, an SRB 1, or an SRB 2. The SRB 0 may be used to transmit an RRC message transmitted through a CCCH, the SRB 1 may be used to transmit an RRC message through a DCCH, and the SRB 2 may be used to transmit through a DCCH and may include a NAS message and/or measurement information. A micro cell node may not parse or process, but only transparently transmits the dedicated control signaling of the UE. A process of establishing a control signaling transmission path between the micro cell node and a macro base station and performing control signaling transmission may be as follows.

Step 601: The micro cell node receives an RRC message that is transmitted by the UE through a RACH.

The UE may identify, according to information that is about a UE identifier and included in uplink transmission scheduled for the first time in a random access process, that the information is control information transmitted by the UE SRB 0. The UE identifier may be a NAS-layer UE identifier or an AS-layer UE identifier. The message may be a request message for initial access or RRC connection re-establishment of the UE. For example, when the uplink transmission scheduled by the UE for the first time includes the NAS-layer UE identifier, the micro cell node may deem that a message carried in the transmission is an RRC connection establishment request message of the UE. The micro cell node may forward the RRC message and the UE identifier to the macro base station through an interface between the micro cell node and the macro base station.

Step 602: The micro cell node forwards the RRC message and a UE identifier to the macro base station through an interface between the micro cell node and the macro base station.

Step 603: The micro cell node receives a bearer establishment request that is between the micro cell node and the macro base station and sent by the macro base station.

The bearer establishment request message may include the following information.

1. A configuration parameter for establishing a control signaling transmission bearer that is between the macro base station and the micro cell node and corresponding to the SRB 1 and/or the SRB 2. Each bearer may include a bearer identifier and a GPRS Tunneling Protocol (GTP) tunnel parameter. The tunnel parameter may be a GTP tunnel parameter for the macro base station side, and may include a transport-layer identifier and a GPRS Tunneling Protocol tunnel end identifier (GTP-TEID). The tunnel parameter may be used to identify an address of the bearer on the macro base station side. Carrying the parameter may indicate establishing one GTP tunnel for each bearer between the macro base station and the micro cell node. Transferring over a signaling bearer between the macro base station and the micro cell node may be performed through the GTP tunnel.

2. A configuration parameter for establishing a signaling radio bearer SRB 1 and/or SRB 2 between the micro cell node and the UE. An SRB configuration parameter may be used to establish an SRB bearer between the micro cell node and the UE for transmission over an air interface. SRB configuration information of the micro cell node may specifically include a packet data convergence protocol (PDCP) configuration parameter, an RLC configuration parameter, a logical channel identifier, and a logical channel configuration parameter. The PDCP configuration parameter may include all or a part of PDCP entity parameters, for example, discard timer duration and a head compression parameter. The RLC configuration parameter may include all or a part of an RLC entity parameter, for example, an RLC-layer mode configuration. The RLC-layer mode configuration may include a configuration parameter of a configuration mode, such as an RLC acknowledged mode (AM), an RLC unacknowledged mode (UM), and a transparent mode (TM). The logical channel configuration parameter includes an uplink configuration parameter and a downlink configuration parameter, for example, a logical channel priority, a prioritized bit rate, and a logical channel group identifier.

3. An RRC message transferred in a link between the UE and the micro cell node.

Step 604: The micro cell node establishes a GTP bearer between the micro cell node and the macro base station and feeds back a bearer parameter on a micro cell node side to the macro base station. At the same time, the micro cell node forwards, to the UE, the RRC message sent by the macro base station, and the UE uses the message to establish an RRC connection between the UE and the micro cell node.

After that, establishment of a bearer between the macro base station and the micro cell node and an SRB bearer between the micro cell node and the UE that are for the dedicated control signaling of the UE is complete. After that, uplink dedicated control signaling and downlink dedicated control signaling of the UE may be forwarded by the micro cell node between the UE and the macro base station.

This embodiment of the present invention provides a method for implementing a radio resource control protocol function. In the method, a macro base station configures control information and sends the control information to a micro cell node, so that the micro cell node forwards the control information to a user equipment. Therefore, the macro base station assists the micro cell node having no RRC function in completing generation and parsing of dedicated control information of the UE and cell common information, so that the user equipment can camp on or be handed over to the micro cell node.

Figure 7:
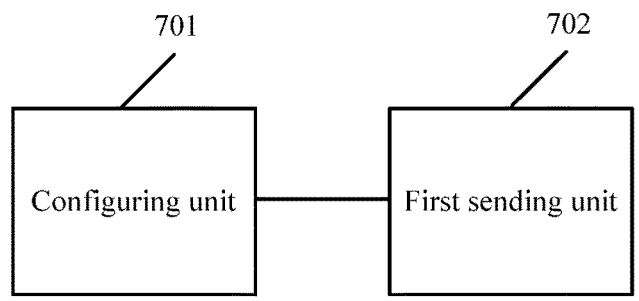
FIG. 7 is a structural device diagram of a macro base station according to an embodiment of the present invention.

Referring to FIG. 7, FIG. 7 is a structural device diagram of a macro base station according to an embodiment of the present invention. As shown in FIG. 7, the device includes a configuring unit 701, configured to configure, by the macro base station, control information. The control information may include cell common control information and dedicated control information of a user equipment UE, where the cell common control information may include system information and paging information.

Optionally, the macro base station may further include a negotiating unit, configured to perform negotiation between the macro base station and a micro cell node to determine the control information configured by the macro base station. When the micro cell node has a part of simplified RRC functions and the micro cell node presets a part of control information, the control information configured by the macro base station may include only the dedicated control information of the user equipment UE. When the micro cell node has no RRC function and/or the micro cell node does not preset control information, the control information configured by the macro base station may include all control information.

Optionally, the configuring unit 701 may be specifically configured to configure, by the macro base station, a system information transmission configuration parameter for the micro cell node. The system information transmission configuration parameter may include information block content and transmission control information. The information block content may include all or a part of system information block content, and the transmission control information may include transmission control information of all or a part of the system information block content.

Figure 8:
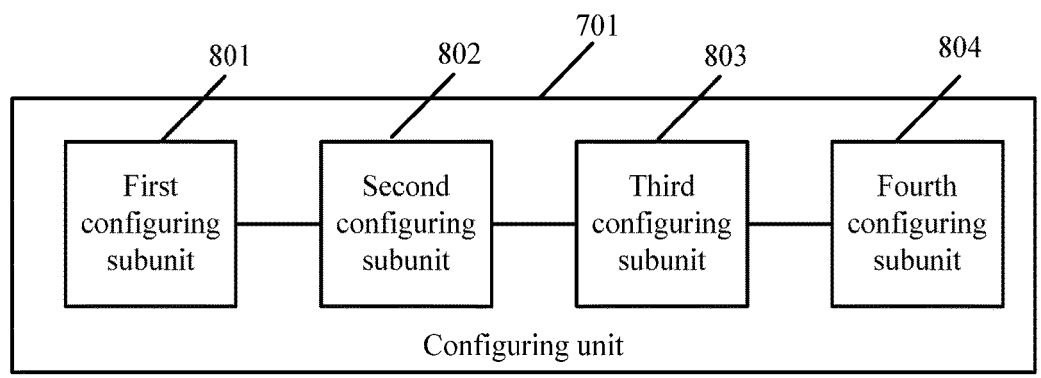
FIG. 8 is a structural device diagram of a configuring unit in a macro base station according to an embodiment of the present invention.

Optionally, referring to FIG. 8, FIG. 8 is a structural device diagram of a configuring unit in a macro base station according to an embodiment of the present invention. The macro base station may further include a first configuring subunit 801. The first configuring subunit 801 may be configured to configure, by the macro base station for the micro cell node, if a transmission control manner of all or a part of the system information block content is fixed, the system information transmission configuration parameter that does not include information block content of a preset transmission control manner. If the information block content is transmitted in a non-periodic manner, the first configuring subunit 801 may be configured to configure transmission control information that is corresponding to the information block content and includes scheduling information of the system information block content. The scheduling information may include a scheduling cycle in which the information block content is transmitted. The scheduling cycle may be used to indicate a transmission cycle and a transmission window length of the information block content, and to indicate a moment or a range of a transmission moment at which the information block content is transmitted in each scheduling cycle. If scheduling information of the multiple pieces of information block content is the same and the scheduling information includes an information block content group, the scheduling information may include an arrangement sequence of the information block content in the information block content group.

Optionally, the macro base station may further include a second configuring subunit 802, configured to configure, by the macro base station, a modification cycle of the system information of the micro cell node, where the modification cycle includes a cycle length and a start moment.

Optionally, the macro base station may further include a third configuring subunit 803, configured to re-configure, by the macro base station, a system information transmission configuration parameter for the micro cell node; and if content of the system information is updated, to specify, by the macro base station, a start moment at which the system information is updated. The start moment may be a specific moment or may be indicated or preset on the micro cell node by the macro base station, and the specific moment may be represented by a system frame number and a radio frame number. The start moment may be indicated or preset on the micro cell node by the macro base station such that the micro cell node starts to transmit updated content at a start moment of a next or an Nth modification cycle.

Optionally, the configuring unit 701 is specifically configured to configure, by the macro base station, a paging information transmission configuration parameter for the micro cell node. The paging information transmission configuration parameter may include paging information content and paging transmission control information, and the paging transmission control information may include a RLC transmission configuration parameter, a MAC layer transmission configuration parameter, and physical-layer transmission configuration information. The paging transmission control information may include a transmission moment corresponding to paging content, where the transmission moment may be a moment of one time of transmission or moments of multiple times of transmission.

Optionally, the macro base station may further include a fourth configuring subunit 804, configured to, when the transmission moment corresponding to the paging content is the moments of multiple times of transmission, configure, by the macro base station when configuring the paging transmission control information, the transmission moment by using a transmission moment list or by using a start moment and a transmission cycle. The macro base station may also include a first sending unit 702, configured to send the control information to the micro cell node, so that the micro cell node forwards the control information to a user equipment, so as to implement a RRC function of the micro cell node.

Figure 9:
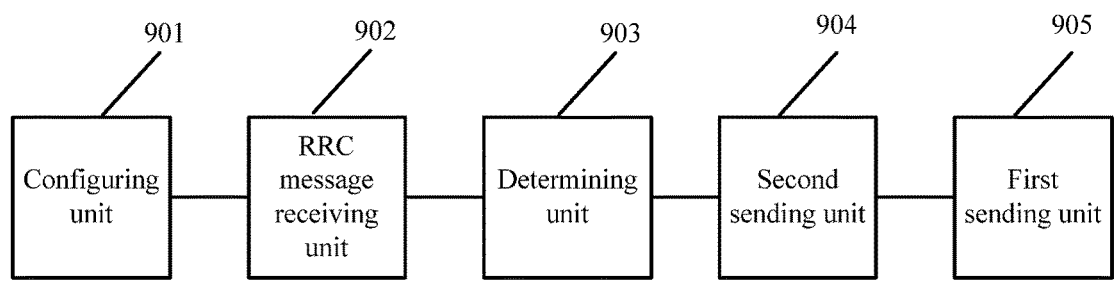
FIG. 9 is a structural device diagram of another macro base station according to an embodiment of the present invention.

In another optional embodiment, referring to FIG. 9, FIG. 9 is a structural device diagram of another macro base station according to an embodiment of the present invention. The macro base station may further include a configuring unit 901, specifically configured to configure, by the macro base station, dedicated control information of the user equipment. The dedicated control information of the user equipment may include a control message transmitted by an SRB, where the control message transmitted by the SRB may include an RRC message transmitted through a CCCH or an RRC message transmitted through a DCCH. The RRC message transmitted through the DCCH is an RRC message including a NAS message and/or measurement information. The macro base station may also include an RRC message receiving unit 902, configured to receive a request message of the micro cell node, where the request message carries an RRC message of the UE; and a determining unit 903, configured to determine, by the macro base station, whether the user equipment is allowed to access the micro cell node. The macro base station may further include a second sending unit 904, configured to, if the macro base station determines that the user equipment is allowed to access the micro cell node, send, by the macro base station, a bearer establishment request to the micro cell node, so that the micro cell node establishes a control information bearer between the micro cell node and the macro base station. The macro base station may further include a first sending unit 905, configured to send the control information to the micro cell node, so that the micro cell node forwards the control information to the user equipment, so as to implement a RRC function of the micro cell node.

This embodiment of the present invention provides a macro base station. The macro base station configures control information and sends the control information to a micro cell node, so that the micro cell node forwards the control information to a user equipment. Therefore, the macro base station assists the micro cell node having no RRC function in completing generation and parsing of dedicated control information of the UE and cell common information, so that the user equipment can camp on or be handed over to the micro cell node.

Figure 10:
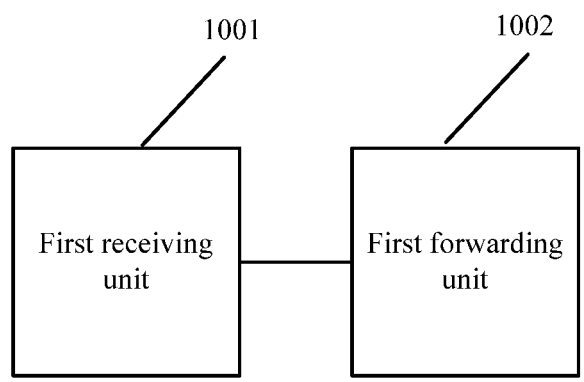
FIG. 10 is a structural device diagram of a micro cell node according to an embodiment of the present invention.

Referring to FIG. 10, FIG. 10 is a structural device diagram of a micro cell node according to an embodiment of the present invention. As shown in FIG. 10, the device may include a first receiving unit 1001, configured to receive, by the micro cell node, control information sent by a macro base station. If the micro cell node has a part of simplified RRC functions and the micro cell node presets a part of control information, the control information configured by the macro base station may include only dedicated control information of a user equipment UE. If the micro cell node has no RRC function and/or the micro cell node does not preset control information, the control information configured by the macro base station may include all control information, including cell common control information and the dedicated control information of the user equipment UE, where the cell common control information may include system information and paging information. The device may further include a first forwarding unit 1002, configured to forward the control information to a user equipment, so that the micro cell node implements a method of an RRC function.

Optionally, the first forwarding unit 1002 may be specifically configured to carry the forwarded control information by using a SRB or a DRB. A control message transmitted by the SRB may include an RRC message transmitted through a CCCH or a DCCH, and the RRC message transmitted through the DCCH may be an RRC message including a NAS message and/or measurement information.

Figure 11:
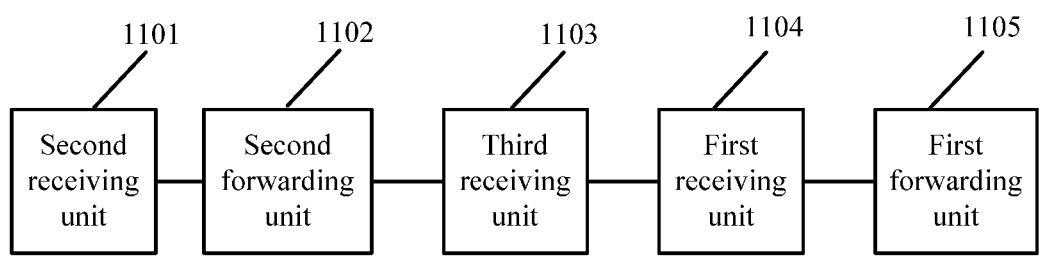
FIG. 11 is a structural device diagram of another micro cell node according to an embodiment of the present invention.

In another optional embodiment, referring to FIG. 11, FIG. 11 is a structural device diagram of another micro cell node according to an embodiment of the present invention. The micro cell node may further include: a second receiving unit 1101, configured to receive an RRC message that is transmitted by a user equipment through a RACH; and a second forwarding unit 1102, configured to forward the RRC message and a user equipment identifier to a macro base station. The micro cell node may further include a third receiving unit 1103, configured to receive a bearer establishment request that is between the micro cell node and the macro base station and sent by the macro base station. The bearer establishment request may include a configuration parameter for establishing a control signaling transmission bearer that is between the macro base station and the micro cell node and corresponding to the signaling radio bearer, and a configuration parameter for establishing a signaling radio bearer between the micro cell node and the user equipment. The micro cell node may also include a first receiving unit 1104, configured to receive, by the micro cell node, the control information sent by the macro base station; and a first forwarding unit 1105, configured to forward the control information to the user equipment, so that the micro cell node implements the RRC function.

This embodiment of the present invention provides a micro cell node. The micro cell node receives control information configured by a macro base station and sends the control information to a user equipment, and therefore, the macro base station assists the micro cell node having no RRC function in completing generation and parsing of dedicated control information of the UE and cell common information, so that the user equipment can camp on or be handed over to the micro cell node.

Figure 12:
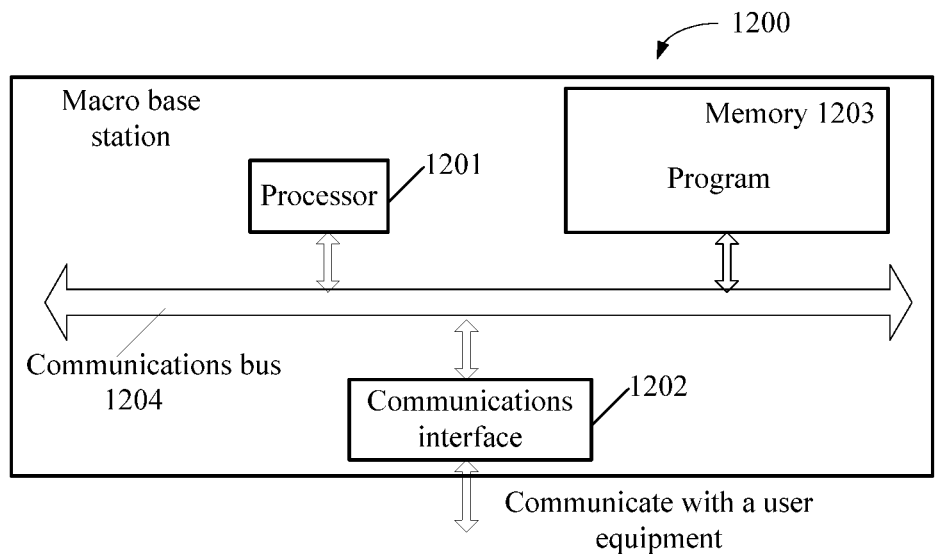
FIG. 12 is a structural apparatus diagram of another macro base station according to an embodiment of the present invention.

Referring to FIG. 12, FIG. 12 is a structural apparatus diagram of another macro base station according to an embodiment of the present invention. Referring to FIG. 12, FIG. 12 is a macro base station 1200 according to an embodiment of the present invention. Specific implementation of the macro base station is not limited in this specific embodiment of the present invention. The macro base station 1200 may include a processor 1201, a chip 1202, a memory 1203, and a bus 1204.

The processor 1201, the chip 1202, and the memory 1203 may complete communication with each other by using the bus 1204.

The chip 1202 may be configured to communicate with a user equipment, and the macro base station 1200 may be connected to a chip of the user equipment by using the chip 1202.

The processor 1201 may be configured to execute a program.

Specifically, the program may include program code, where the program code includes a computer operation instruction.

The program may be specifically used to: configure, by the macro base station, control information; and send the control information to a micro cell node, so that the micro cell node combines the control information and control information that is preset by the micro cell node and then forwards combined control information to a user equipment, or directly forwards the control information to a user equipment, so as to implement all RRC functions of the micro cell node.

The control information may include cell common control information and dedicated control information of a user equipment UE. The cell common control information may include system information and paging information.

Before configuring, by the macro base station, control information required by a UE for accessing a micro cell node, the macro base station may also perform negotiation between the macro base station and the micro cell node to determine the control information configured by the macro base station. If the micro cell node has a part of simplified RRC functions and the micro cell node presets a part of control information, the control information configured by the macro base station may include only the dedicated control information of the user equipment UE. If the micro cell node has no RRC function and/or the micro cell node does not preset control information, the control information configured by the macro base station may include all control information. Configuring, by the macro base station, the control information may include configuring, by the macro base station, a system information transmission configuration parameter for the micro cell node. The system information transmission configuration parameter may include information block content and transmission control information. The information block content may include all or a part of system information block content, and the transmission control information may include transmission control information of all or a part of the system information block content.

The method may further include, if a transmission control manner of all or a part of the system information block content is fixed, configuring, by the macro base station for the micro cell node, the system information transmission configuration parameter that does not include information block content of a preset transmission control manner. The method may further include, if the information block content is transmitted in a non-periodic manner, configuring transmission control information that is corresponding to the information block content and includes scheduling information of the system information block content. The scheduling information may include a scheduling cycle in which the information block content is transmitted. The scheduling cycle may be used to indicate a transmission cycle and a transmission window length of the information block content, and to indicate a moment or a range of a transmission moment at which the information block content is transmitted in each scheduling cycle. If scheduling information of the multiple pieces of information block content is the same and the scheduling information includes an information block content group, the scheduling information may include an arrangement sequence of the information block content in the information block content group.

The method may further include configuring, by the macro base station, a modification cycle of the system information of the micro cell node. The modification cycle may include a cycle length and a start moment.

The method may further include re-configuring, by the macro base station, a system information transmission configuration parameter for the micro cell node; and if content of the system information is updated, specifying, by the macro base station, a start moment at which the system information is updated. The start moment may be a specific moment or may be indicated or preset on the micro cell node by the macro base station, and the specific moment may be represented by a system frame number and a radio frame number. The start moment may be indicated or preset on the micro cell node by the macro base station such that the micro cell node starts to transmit updated content at a start moment of a next or an Nth modification cycle.

Configuring, by the macro base station, control information may include configuring, by the macro base station, a paging information transmission configuration parameter for the micro cell node, where the paging information transmission configuration parameter may include paging information content and paging transmission control information. The paging transmission control information may include a RLC transmission configuration parameter, a MAC layer transmission configuration parameter, and physical-layer transmission configuration information. The paging transmission control information may include a transmission moment corresponding to paging content, where the transmission moment is a moment of one time of transmission or moments of multiple times of transmission.

The method may further include, when the transmission moment corresponding to the paging content is the moments of multiple times of transmission, configuring, by the macro base station when configuring the paging transmission control information, the transmission moment by using a transmission moment list or by using a start moment and a transmission cycle.

The processor 1201 may be one or more central processing units CPUs or an application-specific integrated circuit (ASIC), or may be configured as one or more integrated circuits that implement this embodiment of the present invention.

The memory 1203 may be configured to store the program. The memory 1203 may include a high-speed random access memory (RAM) or may further include a non-volatile memory.

Figure 13:
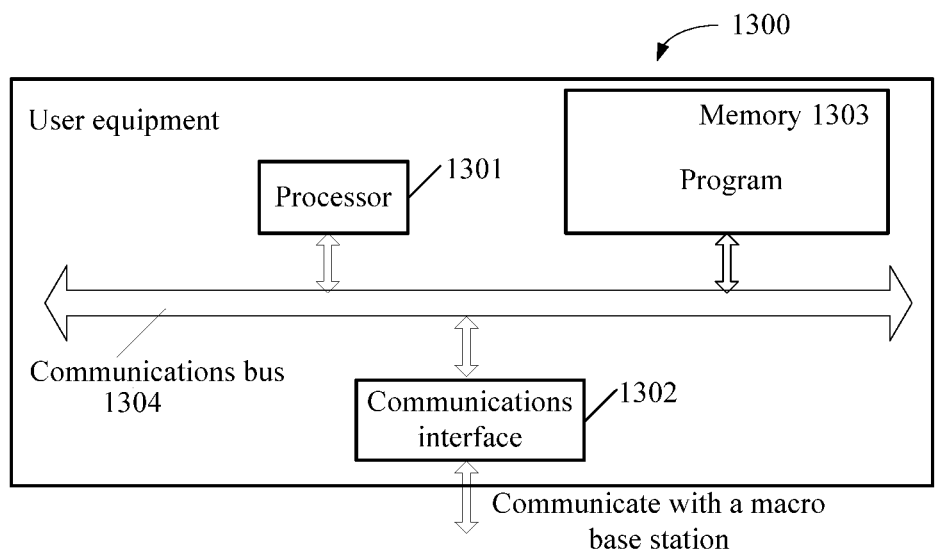
FIG. 13 is a structural apparatus diagram of another micro cell node according to an embodiment of the present invention.

Referring to FIG. 13, FIG. 13 is a structural apparatus diagram of another micro cell node according to an embodiment of the present invention. Referring to FIG. 13, FIG. 13 is a micro cell node 1300 according to an embodiment of the present invention. Specific implementation of the micro cell node is not limited in this specific embodiment of the present invention. The micro cell node 1300 may include a processor 1301, a chip 1302, a memory 1303, and a bus 1304.

The processor 1301, the chip 1302, and the memory 1303 may complete communication with each other by using the bus 1304.

The chip 1302 may be configured to communicate with a macro base station, and the micro cell node 1300 may be connected to a chip of the macro base station by using the chip 1302.

The processor 1301 may be configured to execute a program.

Specifically, the program may include program code, where the program code includes a computer operation instruction.

The program may be specifically used to receive, by the micro cell node, control information sent by the macro base station; and forward the control information to a user equipment, so that the micro cell node implements a method of an RRC function.

Forwarding, by the micro cell node, the control information to a user equipment may include carrying the forwarded control information by using a SRB or a DRB. A control message transmitted by the SRB may include an RRC message transmitted through a CCCH or a DCCH, and the RRC message transmitted through the DCCH may be an RRC message including a NAS message and/or measurement information.

The control information may include cell common control information and dedicated control information of a user equipment UE. The cell common control information may include system information and paging information.

Before a step of receiving the dedicated control information that is of the UE and sent by the macro base station, the method may further include receiving an RRC message that is transmitted by the user equipment through a RACH; forwarding the RRC message and a user equipment identifier to the macro base station; and receiving a bearer establishment request that is between the micro cell node and the macro base station and sent by the macro base station. The bearer establishment request may include a configuration parameter for establishing a control signaling transmission bearer that is between the macro base station and the micro cell node and corresponding to the signaling radio bearer. The bearer establishment request may include a configuration parameter for establishing a signaling radio bearer between the micro cell node and the user equipment.

The processor 1301 may be one or more central processing units CPUs, or an application-specific integrated circuit (ASIC), or may be configured as one or more integrated circuits that implement this embodiment of the present invention.

The memory 1303 may be configured to store the program. The memory 1303 may include a high-speed random access memory (RAM) or may further include a non-volatile memory.

The foregoing descriptions are merely some implementation manners of the present invention, but are not intended to limit the protection scope of the present invention. Any modification, equivalent replacement, or improvement made without departing from the spirit and principle of the present invention shall fall within the protection scope of the present invention.

What is claimed is:

1. A method comprising:
    configuring, by a macro base station, first control information for a user equipment (UE), the first control information comprising at least a portion of total control information that is required by the UE to access a micro cell node, wherein the micro cell node has no radio resource control (RRC) functionality or has only a portion of simplified RRC functionality, and the micro cell node lacks an ability to provide access to UEs using an RRC function, and wherein the first control information is configured with different information based on whether the micro cell node has no RRC functionality or has only the portion of simplified RRC functionality; and
    sending, by the macro base station, the first control information to the micro cell node.

2. The method according to claim 1, wherein the total control information that is required by the UE to access the micro cell node comprises:
    cell common control information and dedicated control information of the UE, wherein the cell common control information comprises system information and paging information.

3. The method according to claim 1, wherein, before configuring, by the macro base station, the first control information for the UE, the method further comprises:
    negotiating, by the macro base station with the micro cell node, to determine the first control information to be configured by the macro base station; and
    wherein, when the micro cell node has only the portion of simplified RRC functionality, and when a portion of the total control information that is required by the UE to access the micro cell node is preset in the micro cell node, the first control information configured by the macro base station comprises only dedicated control information of the UE, and when the micro cell node has no RRC functionality or none of the total control information that is required by the UE to access the micro cell node is preset in the micro cell node, the first control information configured by the macro base station comprises the total control information.

4. The method according to claim 1, wherein configuring, by the macro base station, the first control information comprises:
    configuring, by the macro base station, a system information transmission configuration parameter for the micro cell node, wherein the system information transmission configuration parameter comprises information block content and transmission control information, the information block content comprises all or a part of system information block content, and the transmission control information comprises transmission control information of all or the part of the system information block content.

5. The method according to claim 1, wherein configuring, by the macro base station, the first control information comprises:
configuring, by the macro base station, a paging information transmission configuration parameter for the micro cell node, wherein the paging information transmission configuration parameter comprises paging information content and paging transmission control information, and the paging transmission control information comprises a radio link control (RLC) transmission configuration parameter, a media access control (MAC) layer transmission configuration parameter, and physical-layer transmission configuration information, wherein the paging transmission control information comprises a transmission moment corresponding to the paging information content, and wherein the transmission moment comprises a moment of one time of transmission or moments of multiple times of transmission.

6. The method according to claim 5, wherein the method further comprises:
when the transmission moment corresponding to the paging information content comprises moments of multiple times of transmission, configuring, by the macro base station when configuring the paging transmission control information, the transmission moment by using a transmission moment list or by using a start moment and a transmission cycle.

7. A method comprising:
receiving, by a micro cell node, first control information sent by a macro base station, the micro cell node having no radio resource control (RRC) functionality or has only a portion of simplified RRC functionality, and lacking capability of providing access to user equipments (UEs) using a RRC function, wherein the first control information comprises at least a portion of total control information that is required by a UE to access the micro cell node, and wherein the first control information comprises different information based on whether the micro cell node has no RRC functionality or has only the portion of simplified RRC functionality; and
forwarding the first control information to the UE, the first control information enabling the UE to access the micro cell node.

8. The method according to claim 7, wherein, when the micro cell node has only the portion of simplified RRC functionality and when a portion of the total control information is preset in the micro cell node, the first control information configured by the macro base station comprises only dedicated control information of the UE, and when the micro cell node has no RRC functionality or none of the total control information is preset in the micro cell node, the first control information configured by the macro base station comprises the total control information, the total control information comprising cell common control information and the dedicated control information of the UE, and wherein the cell common control information comprises system information and paging information.

9. The method according to claim 7, wherein forwarding the first control information to the UE comprises:

carrying the forwarded first control information by using a signaling radio bearer (SRB) or a data radio bearer (DRB), wherein a control message transmitted by the SRB comprises an RRC message transmitted through a common control channel (CCCH) or a dedicated control channel (DCCH), and the RRC message transmitted through the DCCH is an RRC message comprising a non-access stratum (NAS) message or measurement information.

10. The method according to claim 9, further comprising:
receiving a first RRC message that is transmitted by the UE through a random access channel (RACH);
forwarding the first RRC message and a user identifier to the macro base station; and
receiving a request for establishing a bearer between the micro cell node and the macro base station and sent by the macro base station, wherein the request comprises a first configuration parameter for establishing a control signaling transmission bearer that is between the macro base station and the micro cell node and corresponding to the SRB, and a second configuration parameter for establishing the SRB between the micro cell node and the UE.

11. A macro base station, wherein the macro base station comprises:
a processor, configured to configure first control information, the first control information comprising at least a portion of total control information that is required by a user equipment (UE) to access a micro cell node, wherein the micro cell node has no radio resource control (RRC) functionality or has only a portion of simplified RRC functionality, and the micro cell node lacks an ability to provide access to UEs using a RRC function, and wherein the first control information is configured with different information based on whether the micro cell node has no RRC functionality or has only the portion of simplified RRC functionality; and
a transmitter, configured to send the first control information to the micro cell node.

12. The macro base station according to claim 11, wherein the total control information comprises:
cell common control information and dedicated control information of the UE, wherein the cell common control information comprises system information and paging information.

13. The macro base station according to claim 12, wherein the processor is further configured to:
perform negotiation with the micro cell node to determine the first control information to be configured by the macro base station, wherein, when the micro cell node has only the portion of simplified RRC functionality and when a portion of the total control information is preset in the micro cell node, the first control information configured by the macro base station comprises only dedicated control information of the UE, and when the micro cell node has no RRC functionality or none of the total control information is preset in the micro cell node, the first control information configured by the macro base station comprises the total control information.

14. The macro base station according to claim 11, wherein the processor is further configured to:
configure, by the macro base station, a system information transmission configuration parameter for the micro cell node, wherein the system information transmission configuration parameter comprises information block content and transmission control information, the information block content comprises all or a part of system information block content, and the transmission control information comprises transmission control information of all or the part of the system information block content.

15. The macro base station according to claim 11, wherein the processor is further configured to:
configure a paging information transmission configuration parameter for the micro cell node, wherein the paging information transmission configuration parameter comprises paging information content and paging transmission control information, and the paging transmission control information comprises a radio link control (RLC) transmission configuration parameter, a media access control (MAC) layer transmission configuration parameter, and physical-layer transmission configuration information, and wherein the paging transmission control information comprises a transmission moment corresponding to paging content, and the transmission moment comprises a moment of one time of transmission or moments of multiple times of transmission.

16. The macro base station according to claim 15, wherein the processor is further configured to:
when configuring the paging transmission control information, configuring the transmission moment by using a transmission moment list or by using a start moment and a transmission cycle.

17. A micro cell node, wherein the micro cell node comprises:
a receiver, configured to receive first control information sent by a macro base station, the micro cell node having no radio resource control (RRC) functionality or has only a portion of simplified RRC functionality, and lacking capability of providing access to user equipments (UEs) using a RRC function, wherein the first control information comprises at least a portion of total control information that is required by a UE to access the micro cell node, and wherein the first control information comprises different information based on whether the micro cell node has no RRC functionality or has only the portion of simplified RRC functions; and
a processor, configured to forward the first control information to a UE, the first control information enabling the UE to access the micro cell node.

18. The micro cell node according to claim 17, wherein, when the micro cell node has only the portion of simplified RRC functionality and when a portion of the total control information is preset in the micro cell node, the first control information configured by the macro base station comprises only dedicated control information of the UE, and when the micro cell node has no RRC functionality or none of the total control information is preset in the micro cell node, the first control information configured by the macro base station comprises the total control information, the total control information comprising cell common control information and the dedicated control information of the UE, wherein the cell common control information comprises system information and paging information.

19. The micro cell node according to claim 17, wherein the processor is further configured to:
carry the forwarded first control information by using a signaling radio bearer (SRB) or a data radio bearer (DRB), wherein a control message transmitted by the SRB comprises an RRC message transmitted through a common control channel (CCCH) or a dedicated control channel (DCCH), and the RRC message transmitted through the DCCH is an RRC message comprising a non-access stratum (NAS) message or measurement information.

20. The micro cell node according to claim 19, wherein the processor is further configured to:
receive a first RRC message that is transmitted by the UE through a random access channel (RACH);
forward the first RRC message and a user identifier to the macro base station; and
receive a request for establishing a bearer between the micro cell node and the macro base station and sent by the macro base station, wherein the request comprises a first configuration parameter for establishing a control signaling transmission bearer that is between the macro base station and the micro cell node and corresponding to the SRB, and a second configuration parameter for establishing the SRB between the micro cell node and the UE.

* * * * *